United States Patent
Ikegami et al.

(10) Patent No.: US 9,328,634 B2
(45) Date of Patent: May 3, 2016

(54) STEAM POWER CYCLE SYSTEM

(71) Applicant: Saga University, Saga-Shi, Saga (JP)

(72) Inventors: Yasuyuki Ikegami, Saga (JP); Takafumi Morisaki, Saga (JP)

(73) Assignee: SAGA UNIVERSITY, Saga (JP)

( * ) Notice: Subject to any disclaimer, the term of this patent is extended or adjusted under 35 U.S.C. 154(b) by 61 days.

(21) Appl. No.: 14/182,022

(22) Filed: Feb. 17, 2014

(65) Prior Publication Data

US 2014/0223911 A1 Aug. 14, 2014

Related U.S. Application Data

(63) Continuation of application No. PCT/JP2012/070425, filed on Aug. 10, 2012.

(30) Foreign Application Priority Data

Aug. 19, 2011 (JP) .................. 2011-179525

(51) Int. Cl.
*F01K 25/06* (2006.01)
*F01K 25/08* (2006.01)
*F01K 25/10* (2006.01)
*F28B 7/00* (2006.01)
(Continued)

(52) U.S. Cl.
CPC .............. *F01K 25/065* (2013.01); *F01K 7/38* (2013.01); *F01K 25/06* (2013.01); *Y02E 10/34* (2013.01)

(58) Field of Classification Search
CPC ......... F01K 25/06; F01K 25/065; F01K 7/38; Y02E 10/34

USPC ................. 60/651, 671, 649, 673, 690, 693
See application file for complete search history.

(56) References Cited

U.S. PATENT DOCUMENTS

| 4,827,877 A | * | 5/1989 | Sumitomo et al. ............ 122/34 |
| 5,617,738 A | * | 4/1997 | Ikegami et al. ............... 62/509 |
| 6,032,467 A | * | 3/2000 | Oshita et al. ................. 60/651 |

(Continued)

FOREIGN PATENT DOCUMENTS

| DE | 102012210803 A1 * | 1/2014 |
| JP | 57-200607 A | 12/1982 |

(Continued)

OTHER PUBLICATIONS

Parallel and Counterflow Heat Exchangers—Engineers Edge 2000.*

*Primary Examiner* — Thomas Denion
*Assistant Examiner* — Jessica Kebea
(74) *Attorney, Agent, or Firm* — Duquette Law Group, LLC

(57) ABSTRACT

There is provided a steam power cycle system that permits to perform an appropriate heat exchange between a working fluid that is a non-azeotropic mixture and a heat source, to enhance the performance of the whole system. More specifically, a plurality of condensers are provided so as to be connected to each other in series, and the working fluid in a gas phase from the expander is introduced into the respective condensers. Consequently, the ratio of a low boiling point substance of the working fluid becomes higher toward the posterior condenser, it is possible to make the condensation temperature of the working fluid lower than that of the anterior condenser. It is therefore possible to make the temperature of the working fluid possibly close to the temperature of the low-temperature fluid, thus permitting an effective use of the difference in temperature of the heat source.

3 Claims, 8 Drawing Sheets

(51) Int. Cl.
*F01B 1/00* (2006.01)
*F01K 7/38* (2006.01)

(56) References Cited

U.S. PATENT DOCUMENTS

| | | | |
|---|---|---|---|
| 6,769,256 B1 * | 8/2004 | Kalina | 60/653 |
| 6,910,334 B2 * | 6/2005 | Kalina | 60/651 |
| 7,264,654 B2 * | 9/2007 | Kalina | 95/228 |
| 7,305,829 B2 * | 12/2007 | Mirolli et al. | 60/649 |
| 7,600,394 B2 * | 10/2009 | Kalina | 62/606 |
| 7,900,451 B2 * | 3/2011 | Amir et al. | 60/641.7 |
| 7,997,076 B2 * | 8/2011 | Ernst | 60/616 |
| 8,176,722 B2 * | 5/2012 | Blonn et al. | 60/39.181 |
| 8,627,663 B2 * | 1/2014 | Ernst et al. | 60/618 |
| 8,833,077 B2 * | 9/2014 | Kalina | 60/649 |
| 2003/0150403 A1 | 8/2003 | Bharathan et al. | |
| 2009/0188253 A1 * | 7/2009 | Smith | F01C 1/16 60/657 |
| 2009/0211251 A1 * | 8/2009 | Petersen et al. | 60/645 |
| 2011/0167826 A1 | 7/2011 | Uehara | |
| 2012/0085095 A1 * | 4/2012 | Penton et al. | 60/647 |
| 2013/0160448 A1 * | 6/2013 | Gaia et al. | 60/651 |
| 2013/0174551 A1 * | 7/2013 | Mahmoud et al. | 60/649 |
| 2013/0174552 A1 * | 7/2013 | Mahmoud et al. | 60/671 |
| 2013/0213040 A1 * | 8/2013 | Goswami et al. | 60/647 |

FOREIGN PATENT DOCUMENTS

| | | | | |
|---|---|---|---|---|
| JP | 59068505 A | * | 4/1984 | F01K 25/10 |
| JP | 07-091211 | | 4/1995 | |
| JP | 7-91361 | | 4/1995 | |
| JP | 07317507 A | * | 12/1995 | F01K 25/06 |
| JP | 2007-500811 A | | 1/2007 | |
| JP | 2011174652 A | * | 9/2011 | |
| WO | 2007/000811 A1 | | 4/2007 | |

* cited by examiner

STEAM POWER CYCLE SYSTEM

CROSS-REFERENCE TO RELATED APPLICATIONS

This application is a continuation of International Application No. PCT/JP2012-070425, filed Aug. 10, 2012, now pending, which claims priority to Japanese Application No. 2011-179525, filed Aug. 19, 2011, the contents of which are incorporated herein by reference.

TECHNICAL FIELD

The present invention relates to a steam power cycle system that cycles a working fluid of non-azeotropic mixture of a plurality of substances, while heating and cooling it, and causes the working fluid repeating a phase change to work, thus obtaining a power.

BACKGROUND ART

As a steam power cycle system that cycles a working fluid, while heating and cooling it, and causes the working fluid repeating a phase change to work, thus obtaining a power, there is known a basic type of Rankine cycle that is provided with an evaporator, an expander (turbine), a condenser and a pump, and utilizes as the working fluid a pure substance such as water.

However, in using the steam power cycle as a power generating equipment, etc., a temperature of both a high-temperature heat source and a low-temperature heat source in the steam power cycle is lower than a boiling point of water, in particular, in the application to a power generation apparatus by an ocean thermal energy conversion, a waste heat recovery power plant, or a power generating apparatus using a hot spring water. In case where a difference in temperature between the heat sources becomes smaller, there has conventionally been proposed, as an alternative to Rankine cycle that used water as the working fluid, a steam power cycle such as the so-called Kalina cycle that uses, as the working fluid, a mixture of water and a substance such as ammonia having a lower boiling point than water, or a mixture of a plurality of kinds of substances having a lower boiling point than water, i.e., a non-azeotropic mixture, which may make a phase-change at a temperature zone lower than the boiling point of water, so as to permit an appropriate phase change of the working fluid to convert effectively a heat into a power. An example of such a conventional steam power cycle is described in JP 57-200607 A and JP 7-91361 A.

CITATION LIST

Patent Literature

[Patent Literature 1] JP 57-200607 A
[Patent Literature 2] JP 7-91361 A

SUMMARY OF INVENTION

Technical Problem

The conventional steam power cycle has a structure as described in each of the patent literatures as indicated above, and the working fluid of non-azeotropic mixture used in such a steam power cycle has a characteristic property in which its temperature will change when a phase change (evaporation, condensation) occurs.

In case of Rankine cycle in which the pure substance is used as the working fluid, a constant variation in temperature of the working fluid, when the phase change occurs, causes a limitation in making the temperature of the working fluid close to the temperature of a fluid serving as a heat source in a heat exchange in a heat exchanger (evaporator, condenser, etc.), in the extent of making the temperature of the working fluid on an outlet side close to the temperature of the fluid as the heat source at an outlet of the heat exchange at best.

To the contrary, in the steam power cycle using the working fluid of non-azeotropic mixture as described in each of the patent literatures as indicated above, the temperature of the working fluid changes when the phase change occurs, with the result that the temperature change of the working fluid counter-flowing to the fluid as the heat source at a predetermined difference in temperature relative to the temperature change of this fluid is permitted in the same manner as a counter-flow heat exchange without any phase change of each of the fluids (see FIG. 7). It is possible to reduce the difference in temperature between the fluid as the heat source and the working fluid, in comparison with Rankine cycle using the working fluid of the pure substance having a constant temperature when the phase change occurs. In case for example of condensation, the temperature change of the working fluid may be achieved so that the temperature of the working fluid at the outlet of the heat exchanger is lower than the temperature of the fluid as the low-temperature heat source at the outlet of the heat exchanger, thus reducing an irreversible loss and leading to a possibility of an enhanced cycle heat efficiency of the whole of the system.

However, in an actual operation of the conventional steam power cycle using the working fluid of non-azeotropic mixture, the temperature of the working fluid on the outlet side of the condenser is made close to the temperature of the fluid as the low-temperature heat source on the outlet side, but it does not reach the lower temperature than it. Accordingly, concerning such a conventional steam power cycle for which a performance assessment has been made on the assumption that there may be achieved the heat exchange so that the temperature of the working fluid on the outlet side of the condenser is lower than the temperature of the fluid as the low-temperature heat source on the outlet side, any performance compatible with the assessment cannot be obtained, thus causing a problem that the performance, which is lower than initially envisioned, has influence on various aspects such as facility costs, etc.

Concerning such a conventional steam power cycle, as a factor in failure of sufficiently reducing the temperature of the working fluid on the outlet side of the condenser relative to the temperature of the fluid as the low-temperature heat source, it is contemplated that the working fluid of non-azeotropic mixture may actually change in temperature in a similar manner to the pure substance.

More specifically, there is contemplated a variation characteristic in which, of the working fluid of mixture of non-azeotropic mixture, e.g., ammonia and water, the working fluid in a gas phase from an expander has an extremely high concentration of a substance having a low-boiling point, i.e., the ammonia, and in a condensation of the working fluid on a heat-transfer surface of the condenser, the substance, which is apt to be condensed and has a high boiling point, of the working fluid in the gas phase is first condensed, and then the working fluid become to one exhibiting the similar characteristic properties to the pure substance, the temperature of the working fluid may change rapidly at the initial stage of condensation relative to the temperature change of the low-temperature heat source, and then almost constant temperature may be maintained (see FIG. 8).

In such a state that the temperature of the working fluid to be condensed may be maintained constant in the actual heat exchange by the condenser, the temperature of the working fluid in the condenser may be maintained higher than the temperature of the low-temperature heat source in the similar manner to the working fluid of pure substance, and there may not be made an effective heat exchange in which the temperature of the working fluid at the outlet of the condenser is lower than the temperature of the low-temperature fluid as the low-temperature heat source at the outlet of the condenser.

Thus, the conventional steam power cycle, which even uses the working fluid of non-azeotropic mixture, does not provide improvement in a sufficient cycle efficiency, and a relatively deteriorated performance of the heat exchanger such as the condenser may require a measure to improve a treating capacity, for example, making the heat exchanger larger, resulting in increased costs of the heat exchanger, thus causing a problem that the matter of such costs of the heat exchanger would deteriorate economic potential of the whole system.

An object of the present invention, which was made to solve the above-described problems, is to provide a steam power cycle system that permits to perform an appropriate heat exchange between a working fluid and a heat source, in case where non-azeotropic mixture is used as the working fluid, and to make the temperature of the working fluid, which is subject to a phase change, possibly close to the temperature of the heat source, to enhance the capacity of the whole system.

Solution to Problem

A steam power cycle system according to the present invention comprises: an evaporator that causes a working fluid of non-azeotropic mixture to make heat exchange with a predetermined high-temperature fluid and evaporates at least part of the working fluid; a gas-liquid separator that separates the working fluid having a high temperature and obtained by the evaporator into a gas phase substance and a liquid phase substance; an expander that receives the gas phase substance of the working fluid as introduced to convert a heat energy held by a fluid into a power; a condenser that causes the working fluid in a gas phase from the expander and the working fluid in a liquid phase from the gas-liquid separator together to make heat exchange with a predetermined low-temperature fluid and condenses the gas phase substance; and a pump that pumps the working fluid from the condenser toward the evaporator, wherein: a plurality of condensers is provided as the condenser, each of the condensers having a flow channel on a working fluid side, which is connected in series and each of the condensers having a flow channel on a low-temperature fluid side, which is connected in series, so as to provide a flow channel design in which the low-temperature fluid passes through the respective condensers in reverse order to an order in which the working fluid passes through the condensers; a part of the working fluid in the gas phase from the expander is drawn from a channel for the working fluid leading to an outlet of the expander and is joined together with the working fluid at respective stages, which is discharged from a preceding condenser of adjacent condensers; and the working fluid in the gas phase is condensed by the condenser, which is placed in a most anterior stage and in a closest position to an outlet of the expander on the channel for the working fluid, and the working fluid in the gas phase as jointed together is also condensed by other respective condenser than the condenser placed in the most anterior stage.

In the present invention, there is provided a plurality of condensers that make heat exchange between the working fluid and the low-temperature fluid as the low-temperature heat source so as to be connected to each other in series and the working fluid in a gas phase from the expander is introduced into the respective condensers to perform condensation. This enables the component ratio of the mixture of the working fluid in the respective condensers to vary, along with joining of the working fluid in a liquid phase and the working fluid in a gas phase having a high ratio of a substance having a low-boiling point of the mixture to introduce them into the respective condensers, with the result that the ratio of the substance having a low-boiling point of the working fluid becomes higher toward the posterior condenser, thus making it possible to make the condensation temperature of the working fluid lower than that of the condenser in the anterior stage. It is therefore possible to make the temperature of the working fluid close to the respective different temperatures of the low-temperature fluids in the respective condensers, and to decrease gradually the temperatures of the working fluids on the outlet side of the respective condensers to make the temperature of the working fluid possibly close to the temperature of the low-temperature fluid, thus permitting an effective use of the difference in temperature of the heat source to improve surely a cycle heat efficiency and enhance the capacity of the system.

The steam power cycle system according to the present invention may have, where appropriate, a configuration in which a plurality of evaporators is provided as the evaporator, each of the evaporators having a flow channel on a working fluid side, which is connected in series and each of the evaporators having a flow channel on a high-temperature fluid side, which is connected in series, so as to provide a flow channel design in which the high-temperature fluid passes through the respective evaporators in reverse order to an order in which the working fluid passes through the evaporators; a part of the working fluid in the liquid phase, which has been separated from the working fluid in the gas phase by the gas-liquid separator, is drawn from a channel for the working fluid in the liquid phase leading to an outlet of the gas-liquid separator and is joined together with the working fluid at respective stages, which is discharged from a preceding evaporator of adjacent evaporators; and a temperature of the working fluid in a mixed state is raised by other respective evaporator than the evaporator, which is placed in a most anterior stage and is a closest position to an outlet of the pump on the channel for the working fluid.

In the present invention, there is provided a plurality of condensers that make heat exchange between the working fluid and the low-temperature fluid as the low-temperature heat source so as to be connected to each other in series and the working fluid in a liquid phase, which has been separated from the working fluid in a gas phase by the gas-liquid separator, is jointed together with the working fluids passing between the respective evaporators, respectively. This enables the component ratio of the mixture of the working fluid in the respective evaporators to vary, along with the joining of the working fluid from the anterior evaporator and the working fluid in a liquid phase having a high ratio of a substance having a high-boiling point of the mixture to introduce them into the posterior evaporator, with the result that the ratio of the substance having a high-boiling point of the working fluid becomes higher toward the posterior evaporator, thus making it possible to make the evaporation temperature of the working fluid higher than that of the evaporator in the anterior stage. It is therefore possible to make the temperature of the working fluid close to the respective different temperatures of the high-temperature fluids in the respective evaporators, and to increase gradually the temperatures of the working fluids on the outlet side of the respective evaporators to make the temperature of the working fluid possibly close to the temperature of the high-temperature fluid, thus permitting a further improvement in a cycle heat efficiency.

DESCRIPTION OF EMBODIMENTS

First Embodiment of the Present Invention

Now, the first embodiment of the present invention will be described below with reference to FIG. 1. The present embodiment will be described as an example in which the present invention is applied to a power generation apparatus by an ocean thermal energy conversion.

Figure 1:
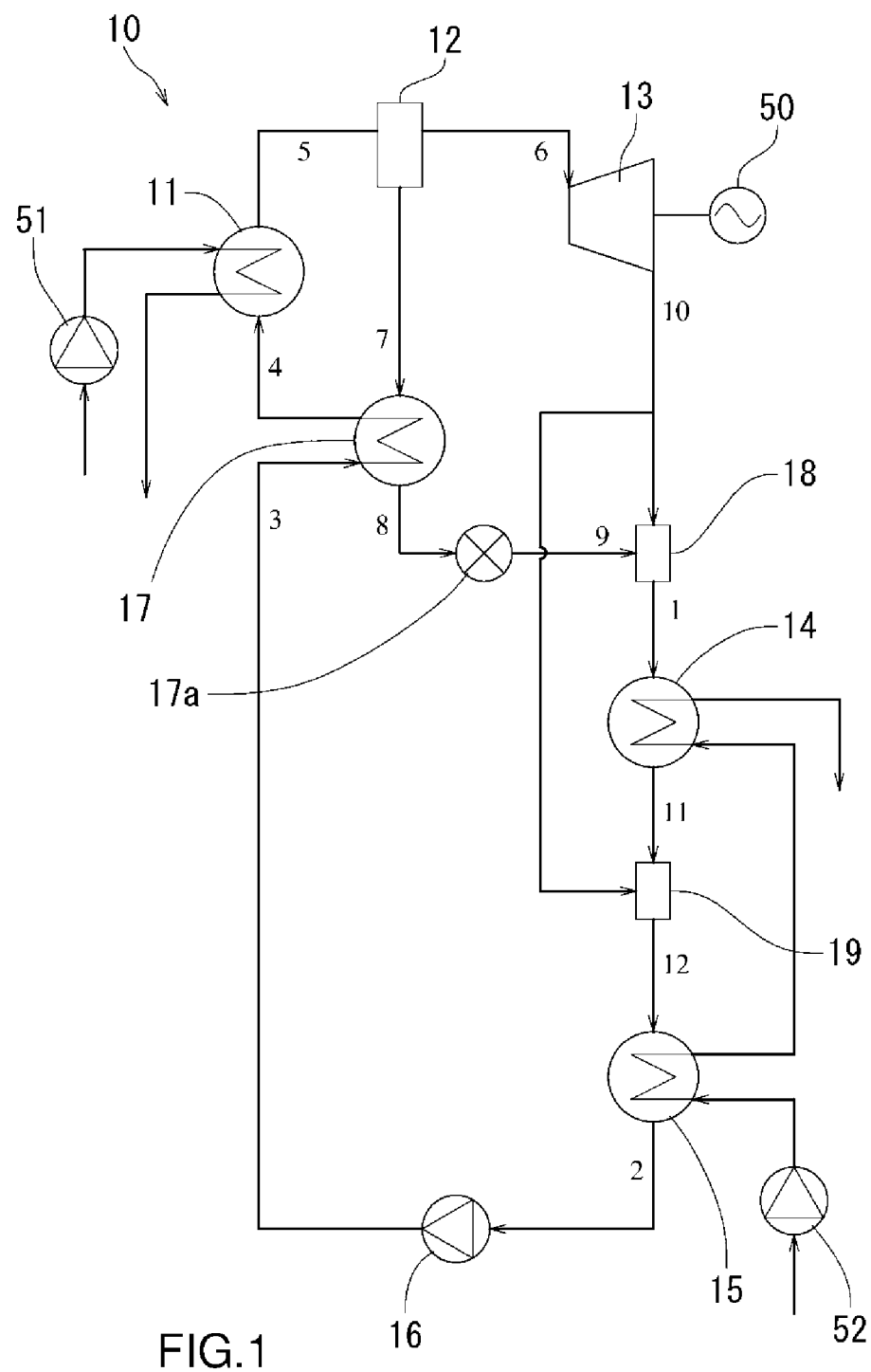
FIG. 1 is a schematic system diagram of a steam power cycle system according to the first embodiment of the present invention.

In FIG. 1 as indicated above, a steam power cycle system 10 according to this embodiment of the present invention is provided with an evaporator 11 that makes heat exchange of a working fluid composed of ammonia and water with a high-temperature seawater as a claimed high-temperature fluid and elevates the temperature of the working fluid to evaporate at least part of it; a gas-liquid separator 12 that separates the working fluid from the evaporator 11 into a gas phase substance and a liquid phase substance; a turbine 13 as a claimed expander that operates by receiving the working fluid in a gas phase as introduced, which has been separated by the gas-liquid separator 12, and converts heat energy held by the working fluid into a power; first and second condensers 14, 15 that make heat exchange of the working fluid in a gas phase from the turbine 13 with a cold deep seawater as a claimed low-temperature fluid, etc., to condense it and convert it into a liquid phase; a pump 16 that pumps the working fluid taken out from the condensers 14, 15 to the evaporator 11; a regenerator 17 that makes heat exchange of the working fluid in a liquid phase, which has been separated by the gas-liquid separator 12, with the working fluid, which has been pumped out toward the evaporator 11; and the first and second mixers 18, 19 that mixes the working fluid in a liquid phase, which has been travelled from the gas-liquid separator 12 and passed through the regenerator 17, with the working fluid from the turbine 13.

Of these structural components, the turbine 13 and the pump 16 are the same as the known devices used in a commonly-used steam power cycle and description of them will be omitted.

The power generation apparatus by an ocean thermal energy conversion is composed of such a steam power cycle system 10 and a power generator 50 driven by the turbine 13. The above-mentioned power generator 50 is the same as a known power generator used for power generation, which is operated by a driving source of a turbine, and the detailed description of it will be omitted.

The above-mentioned evaporator 11 has a known structure as a heat exchanger that permits the working fluid in a liquid phase and a high-temperature fluid as the high-temperature heat source to flow in the inside, and makes heat exchange between the working fluid and the high-temperature fluid, and the detailed description of it will be omitted. A channel communicating with the regenerator 17 is connected to the evaporator 11 on the inlet side of the working fluid so that the working fluid, which has been heated through the heat exchange in the regenerator 17, flows into the evaporator 11. A channel communicating with the gas-liquid separator 12 is connected to it on the outlet side of the working fluid so that the working fluid, which has been heated through the heat exchange in the evaporator 11, flows into the gas-liquid separator 12.

The above-mentioned gas-liquid separator 12 is a known device to separate the working fluid, which has been heated to a high temperature through the heat exchange by the evaporator 11 to be converted into a gas-liquid two-phase, into a gas phase substance and a liquid phase substance, and the detailed description of it will be omitted. The working fluid is separated into the gas phase substance and the liquid phase substance in the above-mentioned gas-liquid separator 12, the working fluid in a gas phase flows toward the turbine 13 through the channel communicating with the inlet side of the turbine 13, and the working fluid in a liquid phase flows toward the regenerator 17 through the channel communicating with the regenerator 17.

The first mixer 18 as described above is communicated with the outlet of the turbine 13, the inlet of the first condenser 14 and the outlet of the regenerator 17 so as to cause the working fluid in a gas phase from the turbine 13 and the working fluid in a liquid phase from the regenerator 17 to flow simultaneously in a mixed state, or where appropriate, to cause the working fluid in a liquid phase to absorb a part of the working fluid in a gas phase. The working fluid in a liquid phase and the working fluid remaining in a gas phase flow in a gas-liquid two-phase as kept from the first mixer 18 toward the first condenser 14.

The second mixer 19 as described above is communicated with the outlet of the turbine 13, the outlet of the first condenser 14 and the inlet of the second condenser 15 so as to cause the working fluid in a gas phase from the turbine 13 and the working fluid in a liquid phase from the first condenser 14 to flow simultaneously in a mixed state, or where appropriate, to cause the working fluid in a liquid phase to absorb a part of the working fluid in a gas phase. The working fluid in a liquid phase and the working fluid remaining in a gas phase flow in a gas-liquid two-phase as kept from the second mixer 19 toward the second condenser 15.

The condensers 14, 15 as described above include the first condenser 14 and the second condenser 15. Of these condensers, the first condenser 14 is communicated with the first mixer 18 and causes the working fluid in a gas-liquid two-phase to flow into it and causes also the low-temperature fluid as the low-temperature heat source to flow through it so as to make heat exchange between the working fluid and the low-temperature fluid.

The second condenser 15 causes the working fluid in a gas-liquid two-phase from the second mixer 19 to flow into it and causes also the predetermined low-temperature fluid as the low-temperature heat source to flow through it so as to make heat exchange between the working fluid and the low-temperature fluid.

The first condenser 14 and the second condenser 15 has the same structure as a known heat exchanger to make heat exchange between the working fluid and the low-temperature fluid, and the detailed description of them will be omitted.

The first condenser 14 cools the working fluid in a liquid phase and condenses the working fluid in a gas phase by making simultaneously heat exchange of the working fluids in a gas phase and a liquid phase, respectively from the first mixer 18 with the low-temperature fluid as described above.

The second condenser 15 cools the working fluid in a liquid phase and condenses the working fluid in a gas phase by making simultaneously heat exchange of the working fluids in a gas phase and a liquid phase, respectively from the second mixer 19 with the low-temperature fluid as described above.

These condensers 14, 15 are combined so as to use commonly the low-temperature fluid as the low-temperature heat source in a predetermined order. More specifically, the channels for the low-temperature fluid in the condensers 14, 15 are connected to each other so that the low-temperature fluid first passes through the second condenser 15 and then go toward the first condenser 14.

There is provided on the posterior side of the second condenser 15 the pump 16 to pump all the working fluid in a liquid phase also including the condensed of the working fluid in a gas phase from the condenser 15 toward the regenerator 17 and the evaporator 11.

The regenerator 17 is a heat exchanger to make heat exchange between the working fluid having a low temperature before flowing from the second condenser 15 through the pump 16 into the evaporator 11, and the working fluid having a high temperature in a liquid phase immediately after being separated from the working fluid in a gas phase by the gas-liquid separator 12. It has the same structure as a known heat exchanger in the same manner as the evaporator 11 and the condensers 14, 15 as described above and the detailed description of them will be omitted.

In this regenerator 17, the working fluid, which has been introduced from the side of pump 16 and heated through heat exchange with the working fluid having a high temperature in a liquid phase from the other gas-liquid separator 12, flows toward the inlet side of the evaporator 11, while the working fluid, which has been introduced from the side of the gas-liquid separator 12, passes through the regenerator 17 and then flows toward the first mixer 18.

There is provided a decompression unit 17a in the middle of the channel for the working fluid in a liquid phase flowing from this regenerator 17 toward the first mixer 18 so that the working fluid in a liquid phase from the regenerator 17 passes through the decompression unit 17a to decrease its pressure and then is introduced into the first mixer 18. An auxiliary pump to pressurize the working fluid and pump it out may be provided between the respective devices as described above for constituting the steam power cycle system 10, where appropriate.

Now, an operation of the steam power cycle system according to the embodiment of the present invention will be described. It is assumed that a high-temperature seawater as the high-temperature fluid and a low-temperature seawater as the low-temperature fluid are continuously introduced into the evaporator 11 and the condensers 14, 15, respectively in sufficient amounts to make heat exchange.

In the evaporator 11, there is made heat exchange between the working fluid and the high-temperature seawater as the high-temperature fluid, which is introduced while being pressurized by an external pump 51. The working fluid as heated by such heat exchange converts into a gas-liquid two-phase by evaporation of a part of it, i.e., mainly ammonia having a low-boiling point due to the raised temperature. The working fluid having such a high temperature in the gas-liquid two-phase flows from the evaporator and reaches the gas-liquid separator 12.

The working fluid having a high temperature is separated into a gas phase and a liquid phase in the gas-liquid separator 12, and the working fluid having a high temperature in a gas phase from the gas-liquid separator 12 flows in a channel toward the turbine 13 and the working fluid having a high temperature in a liquid phase flows in a channel from the gas-liquid separator 12 toward the regenerator 17. The working fluid in a liquid phase, which has been discharged from the regenerator 17, passes through the decompression unit 17a and is introduced into the first mixer 18.

The working fluid having a high temperature in a gas phase, which has been discharged from the gas-liquid separator 12, contains a main constituent of ammonia having a low-boiling point (about 99%), and such a working fluid in a gas phase reaches the turbine 13 to operate it. The power generator 50 is driven by this turbine 13 so that heat energy is converted into a usable power, and further an electric power. The working fluid in a gas phase after being expanded by the turbine 13 for performing the task comes into a state in which a pressure and a temperature are decreased.

The working fluid in a gas phase, which has been discharged from the turbine 13, flows in a channel branching into two on posterior side of the outlet of the turbine, and a part of the fluid is introduced into the first mixer 18 and the remaining is introduced into the second mixer 19.

On the other hand, the working fluid having a high temperature in a liquid phase, which has been discharged from the gas-liquid separator 12, is introduced into the regenerator 17. The regenerator 17 makes heat exchange between the working fluid having a high temperature in a liquid phase as introduced from this gas-liquid separator 12 and the working fluid in a liquid phase flowing from the pump 16 toward the evaporator 11, to recover heat held by the working fluid on the high-temperature side to raise a temperature of the working fluid flowing toward the evaporator 11. The working fluid in a liquid phase from the gas-liquid separator 12, which has been cooled through the heat exchange in this regenerator 17, is discharged from the regenerator 17 and then passes through the decompression unit 17a and is introduced into the first mixer 18.

In the first mixer 18, the working fluid in a gas phase as introduced from the turbine 13 comes into contact with the working fluid in a liquid phase, which has flowed from the regenerator 17 and passed through the decomposition unit 17a and then been introduced into it, to be mixed together, or sometimes a part of the working fluid in a gas phase is absorbed by the working fluid in a liquid phase, and is converted into a liquid phase. The working fluid remaining in a gas phase flows together with the working fluid in a liquid phase toward the first condenser 14, and the working fluid is introduced in a gas-liquid two-phase into the condenser 14.

In the first condenser 14, the working fluid in a gas-liquid two-phase as introduced from the first mixer 18 is caused to make heat exchange with the cold seawater as the low-temperature fluid, which has once passed through the second condenser 15 and then introduced into it, and when the whole of the working fluid is cooled, the working fluid in a gas phase is condensed into a liquid phase due to the cooling by the heat exchange. The working fluid, which has almost been converted into a liquid phase, is discharged from the first condenser 14 to the outside and then reaches the second mixer 19.

During such condensation, a substance having a high-boiling point of the working fluid in a gas phase first condenses and the temperature of the working fluid changes rapidly. Then, the temperature transitions into the similar state to an isothermal change and the temperature of the working fluid becomes to an approximate temperature at the outlet of the first condenser 14 for the low-temperature fluid.

The second mixer 19 received a part of the working fluid in a gas phase as introduced from the turbine 13. The working fluid having a high temperature in a gas phase comes into contact with the working fluid in a liquid phase, which has been introduced from the first condenser 14 to be mixed together, or sometimes a part of the working fluid in a gas phase is absorbed by the working fluid in a liquid phase, and is converted into a liquid phase.

The working fluid remaining in a gas phase flows together with the working fluid in a liquid phase toward the second condenser 15, and the working fluid is introduced in a gas-liquid two-phase into the condenser 15.

The concentration of ammonia of the working fluid as introduced into the second condenser 15 becomes higher than that of the working fluid in the first condenser 14 by joining a part of the working fluid in a gas phase having a high concentration of ammonia from the turbine 13 together with the working fluid in a liquid phase as introduced from the first condenser 14.

In the second condenser 15, the working fluid in a gas-liquid two-phase as introduced from the second mixer 19 is caused to make heat exchange with the cold seawater having a low temperature as separately introduced as the low-temperature fluid and when the whole of the working fluid is cooled, the working fluid in a gas phase is condensed into a liquid phase due to the cooling by the heat exchange.

During such condensation, a substance having a high-boiling point of the working fluid in a gas phase first condenses and the temperature of the working fluid changes rapidly. Then, the temperature transitions into the similar state to an isothermal change and the temperature of the working fluid becomes to an approximate temperature at the outlet of the condenser for the low-temperature fluid. However, the concentration of ammonia of the working fluid in the second condenser 15 becomes higher than that of the working fluid in the first condenser 14, and the condensation temperature of the working fluid in the second condenser 15 becomes lower than the condensation temperature of the working fluid in the first condenser 14. Thus, it is possible to decrease sufficiently the temperature of the working fluid to make it close to the temperature of the low-temperature fluid by causing it to pass through the two condensers 14, 15.

The working fluid, which has almost been converted into a liquid phase in this manner, comes out from the second condenser 15 and then passes through the pump 16 to be pressurized and flows toward the regenerator 17. Then, the working fluid is introduced into the regenerator 17 and caused to make heat exchange with the working fluid in a liquid phase after separation by the gas-liquid separator 12 as described above to elevate the temperature, and comes out from the regenerator 17 and returns to the inside of the evaporator 11, and then the heat exchange step in the evaporator 11 and the subsequent steps are repeated in the same manner as described above.

The seawaters as the low-temperature fluid, which have continuously been used for the respective heat exchanges in the second condenser 15 and the first condenser 14, have been exposed to heat from the working fluids, with the result that the temperature of them are elevated to a predetermined temperature. These seawaters come out from the condenser 14 and are discharged into an outside of the system such as a sea. The seawater as the high-temperature fluid, which has the decreased temperature due to the heat exchange with the working fluid in the evaporator 11, comes out from the evaporator 11 and is also discharged into an outside of the system such as sea.

On the other hand, new seawater is supplied for the heat exchange in the evaporator 11 and the condensers 14, 15 by operating the pumps 51, 52, and the steps as described above are repeated during a use of the system, i.e., a continuous operation of the cycle by the steam power cycle system 10.

Seawater existing in extremely large quantity is used as the high-temperature fluid and the low-temperature fluid and an influence of heat held by the seawater after the heat exchange on the whole of seawater, after discharging the seawater after the heat exchange into the sea outside of the system, i.e., the temperature change of the whole of seawater after the discharge is vanishingly small. The temperature change does not occur in the seawater as newly introduced into the evaporator 11 and the condensers 14, 15 for the continuous heat exchange so that the heat exchange can continuously be made at the same temperature condition as the initial stage of the heat exchange.

In the steam power cycle system according to the embodiment of the present invention, there is provided a plurality of condensers 14, 15 that make heat exchange between the working fluid and the low-temperature fluid as the low-temperature heat source so as to be connected to each other in series and the working fluid in a gas phase from the turbine 13 is introduced into the respective condensers 14, 15 to perform condensation. This enables the component ratio of the mixture of the working fluid in the respective condensers 14, 15 to vary, along with joining of the working fluid in a liquid phase and the working fluid in a gas phase having a high ratio of a substance having a low-boiling point of the mixture to introduce them into the respective condensers 14, 15, with the result that the ratio of the substance having a low-boiling point of the working fluid becomes higher in the second condenser 15 at the posterior side, thus making it possible to make the condensation temperature of the working fluid lower than that of the first condenser 14 in the anterior stage. It is therefore possible to make the temperature of the working fluid close to the respective different temperatures of the low-temperature fluids in the respective condensers, and to decrease gradually the temperatures of the working fluids on the outlet side of the respective condensers 14, 15 to make the temperature of the working fluid possibly close to the temperature of the low-temperature fluid, thus permitting an effective use of the difference in temperature of the heat source to improve surely a cycle heat efficiency and enhance the capacity of the system.

In the steam power cycle system according to the embodiment as described above of the present invention, the two condensers 14, 15 are connected in series so as to provide a two-stage structure for the common use of the working fluid and the low-temperature fluid. However, the present invention is not limited only to such an embodiment and there may be applied a three, four, or more stage structure. In such a case, a part of the working fluid from the turbine 13, which is taken out from the channel for the working fluid communicating with the outlet of the turbine, is joined with the working fluid at the respective stage from the condenser at the anterior stage between the respective condensers, so as to cause the respective condensers to condense the working fluid in a gas phase, in the same manner as the embodiment as described above of the present invention. Increase in the number of stages of the condenser results in achieving a state in which the temperature of the working fluid, which has been decreased by passing through the condenser at the final stage, may be lower than the low-temperature fluid, which has been subjected to the heat exchange in all the condensers to elevate the temperature at a maximum, thus making it possible to decrease the temperature of the working fluid in a plurality of condensers to make it possibly close to the temperature of the low-temperature fluid, leading to a further improvement in cycle heat efficiency.

Figure 2:
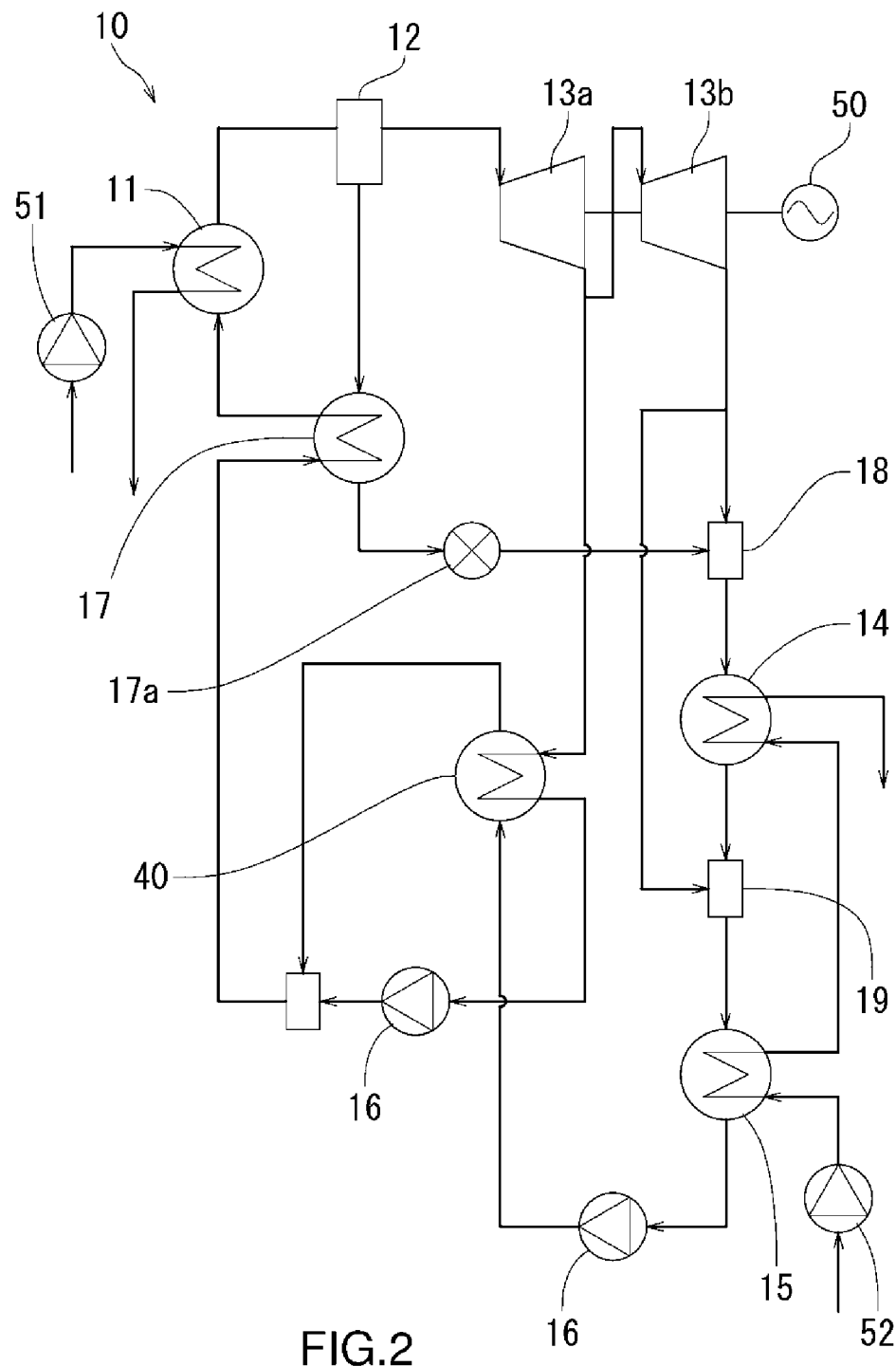
FIG. 2 is another schematic system diagram of the steam power cycle system according to the first embodiment of the present invention according to the embodiment of the present invention.

In the steam power cycle system according to the embodiment as described above of the present invention, there is applied a cycle structure in which the two condensers 14, 15 as provided are added to the so-called Kalina cycle, as the basic cycle, in which the working fluid in a liquid phase, which has been separated from the gas phase substance by the gas-liquid separator 22, is joined together with the working fluid in a gas phase from the turbine 13 in the mixer 18, and a system in which a part of the working fluid in a gas phase from the turbine 13 is joined together with the respective working fluids flowing the respective condensers 14, 15. However, the present invention is not limited only to such an embodiment and it may be applied to the other steam power cycle, which uses the non-azeotropic mixture as the working fluid and has a structure in which a plurality of condensers is provided and a part of the working fluid in a gas phase from the expander is joined together with the respective working fluids flowing between the respective condensers. There may be adopted a cycle structure based on the so-called Uehara cycle, as the basic cycle, in which the working fluid in a gas phase as extracted in the middle between two turbines 13a, 13b is caused to make heat exchange with the working fluid in a liquid phase from the condenser 15 in a heater 40, as shown in FIG. 2, thus making it possible to decrease the temperature of the working fluid in a plurality of condensers 14, 15 to make it possibly close to the temperature of the low-temperature fluid, leading to an improvement in cycle heat efficiency in the same manner as the embodiment as described above of the present invention.

Second Embodiment of the Present Invention

Now, the second embodiment of the present invention will be described below with reference to FIG. 3.

Figure 3:
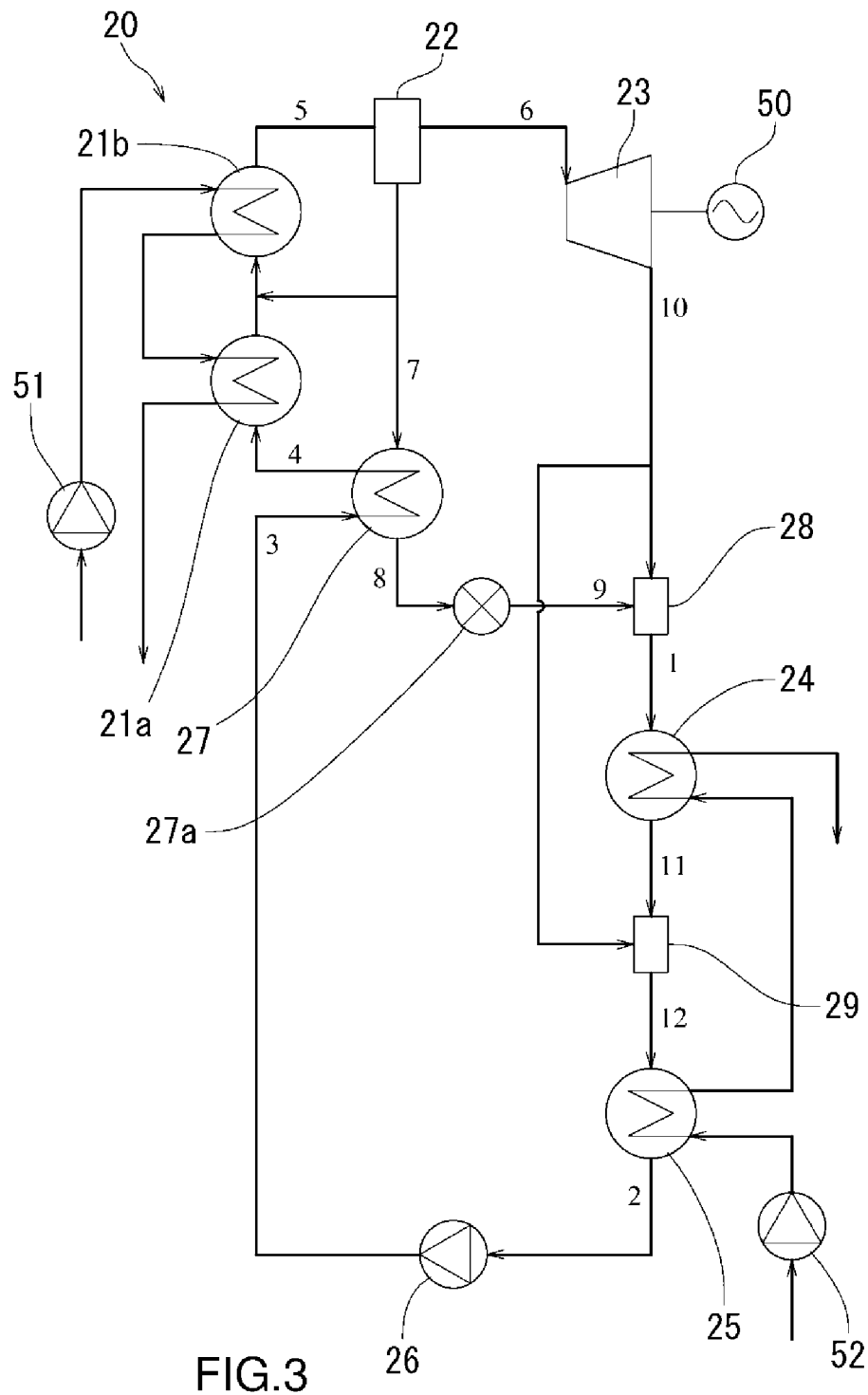
FIG. 3 is a schematic system diagram of the steam power cycle system according to the second embodiment of the present invention.

In FIG. 3 as indicated above, a steam power cycle system 20 according to this embodiment of the present invention is provided with a gas-liquid separator 22, a turbine 23, condenser 24, 25, a pump 26, a regenerator 27 and mixers 28, 29, in the same manner as the first embodiment of the present invention as described above, but has a different structure in which two evaporators 21a, 21b are provided, and a part of the working fluid in a liquid phase, which has been separated by the gas-liquid separator 22, is joined together with the working fluid directed to the second evaporator 21b, which has been provided to cause the working fluid to flow through it at a posterior stage, and then introduced into the second evaporator 21b.

The power generation apparatus by an ocean thermal energy conversion is composed of such a steam power cycle system 20 according to this embodiment of the present invention and a power generator 50 driven by the turbine 23. The turbine 23, the condensers 24, 25, the pump 26, the regenerator 27, and the mixers 28, 29 as indicated above are the same as those in the first embodiment of the present invention as described above, and the detailed description of them will be omitted.

Concerning the connection of the channels for the high-temperature fluid and the low-temperature fluid in the steam power cycle system 20, there is adopted a passing order as set in which the low-temperature fluid flows from the second condenser 25 to the first condenser 24 in the same manner as the first embodiment of the present invention, as well as a passing order as set in which the high-temperature fluid flows from the second evaporator 21b to the first evaporator 21a.

The above-mentioned first evaporator 21a permits the working fluid and a high-temperature seawater as the above-mentioned high-temperature heat source to flow in the inside, makes heat exchange between the working fluid and the high-temperature fluid, and elevates the temperature of the working fluid to evaporate a part of it, thus providing the working fluid in a gas phase. It has the same known heat exchanger structure as the evaporator 11 and the condensers 14, 15 in the first embodiment of the present invention as described above, and the detailed description of it will be omitted.

A channel communicating with the regenerator 27 is connected to the first evaporator 21a on the inlet side of the working fluid so that the working fluid, which has been heated through the heat exchange in the regenerator 27, flows into the evaporator 21a. A channel communicating with the second evaporator 21b is connected to it on the outlet side of the working fluid so that the working fluid, which has been heated through the heat exchange in the first evaporator 21a, flows into the second evaporator 21b.

The above-mentioned second evaporator 21b permits the working fluid in a liquid phase and a high-temperature seawater as the abovementioned high-temperature heat source to flow in the inside, makes heat exchange between the working fluid and the high-temperature fluid, and elevates the temperature of the working fluid to evaporate a part of it, thus providing the working fluid in a gas phase in the same manner as the first evaporator 21a. It has the same known heat exchanger structure as the first evaporator 21a as described above, and the detailed description of it will be omitted.

A channel communicating with, in addition to the first evaporator 21a, the outlet for the working fluid in a liquid phase of the gas-liquid separator 22, is connected to the second evaporator 21b on the inlet side of the working fluid, and a channel communicating with the inlet of the gas-liquid separator 22 is connected to the outlet side of the working fluid, so that the working fluid from the first evaporator 21a and the working fluid from the gas-liquid separator 22 are joined together and these working fluids are heated through the heat exchange in the second evaporator 21b, and then reach the gas-liquid separator 22.

The above-mentioned gas-liquid separator 22 is a known device to separate the working fluid, which has been heated to a high temperature through the heat exchange with the high-temperature seawater by the evaporator 21 to be converted into a gas-liquid two-phase, into a gas phase substance and a liquid phase substance in the same manner as the first embodiment of the present invention, and the detailed description of it will be omitted. The working fluid is separated into the gas phase substance and the liquid phase substance in this gas-liquid separator 22, and the working fluid in a gas phase flows toward the turbine 23 through the channel communicating with the inlet side of the turbine 23.

Meanwhile, a part of the working fluid in a liquid phase passes through the channel by which the outlet side of the working fluid in a liquid phase of the gas-liquid separator 22 and the inlet side of the second evaporator 21b are communicated with each other, is directed toward the inlet side of the second evaporator 21b, and then joined together with the working fluid flowing from the first evaporator 21a to the second evaporator 21b, and enters the second evaporator 21b. The remaining of the working fluid in a liquid phase passes through the channel communicating with the regenerator 27 and is directed toward the regenerator 27.

Now, an operation of the steam power cycle system according to the embodiment of the present invention will be described. It is assumed that a high-temperature seawater as the high-temperature fluid and a low-temperature seawater as the low-temperature fluid are continuously introduced into the evaporators 21a, 21b and the condensers 24, 25, respectively in sufficient amounts to make heat exchange.

In the first evaporator 21a, there is made heat exchange between the high-temperature seawater as the high-temperature fluid, which has once passed through the second evaporator 21b, all the working fluid in a liquid phase, which has been introduced from the channels for the working fluid communicating with the regenerator 27. The working fluid as heated by such heat exchange converts into a gas phase by evaporation of a part of it, i.e., mainly ammonia having a low-boiling point due to the raised temperature.

The working fluid, which has been subjected to the elevation of temperature in the first evaporator 21a and converted into a gas-liquid two-phase, comes out from the evaporator 21a and is joined together with a part of the working fluid having a high temperature in a liquid phase, which has been separated by the gas-liquid separator 22, and then introduced into the second evaporator 21b.

A percentage of water in the working fluid as introduced into the second evaporator 21b becomes higher than that of the working fluid in the first evaporator 21a by joining a part of the working fluid in a liquid phase as separated by the gas-liquid separator 22, i.e., the working fluid in a liquid phase having a higher percentage of water of a high-boiling substance together with the working fluid from the first evaporator 21a.

The second evaporator 21b makes heat exchange of a combination of the working fluid in a gas-liquid two-phase from the first evaporator 21a and a part of the working fluid having a high temperature in a liquid phase as separated by the gas-liquid separator 22, with the high-temperature seawater as introduced as the high-temperature fluid while being subjected to pressure by the external pump 51, and the working fluid as heated through the heat exchange further evaporates a part in a liquid phase along with the elevated temperature.

During such evaporation, a substance having a low boiling point of the working fluid in a liquid phase first evaporates, the temperature of the working fluid rapidly changes, and then it transitions into the similar state to an isothermal change and becomes to an approximate temperature at the outlet of the evaporator for the high-temperature fluid. However, a percentage of water in the working fluid as introduced into the second evaporator 21b becomes higher than that of the working fluid in the first evaporator 21a, and the evaporation temperature of the working fluid in the second evaporator 21b becomes higher than the evaporation temperature of the working fluid in the first evaporator 21a. Thus, it is possible to increase sufficiently the temperature of the working fluid to make it close to the temperature of the high-temperature fluid by causing it to pass through the two evaporators 21a, 21b.

The working fluid, which has been subjected to elevation of temperature by the second evaporator 21b to be converted into a gas-liquid two-phase at a high temperature, comes out from the second evaporator 21b and then reaches the gas-liquid separator 22. The working fluid having a high temperature is separated into the gas phase substance and the liquid phase substance in the gas-liquid separator 22, and the working fluid having a high temperature in a gas phase comes out from the gas-liquid separator 22 and then flows toward the turbine 23. While the working fluid having a high temperature in a liquid phase comes out from the gas-liquid separator 22 to the regenerator 27, a part of the working fluid in a liquid phase is divided from the fluid, which is directed to the regenerator 27, and flows a channel extending from the gas-liquid separator 22 to the inlet side of the second evaporator 21b, and then is introduced into the second evaporator 21b together with the working fluid, which has come out from the first evaporator 21a.

The turbine 23 is driven by the working fluid having a high temperature in a gas phase, which has come out from the gas-liquid separator 22 and then reached the turbine 23. The power generator 50 is driven by this turbine 23 so that heat energy is converted into a usable power, and further an electric power. The working fluid in a gas phase after being expanded by the turbine 13 for performing the task comes into a state in which a pressure and a temperature are decreased. The working fluid in a gas phase, which has been discharged from the turbine 23, is introduced into the first mixer 28 and the second mixer 29, respectively, in the same manner as the first embodiment as described above of the present invention.

On the other hand, the working fluid having a high temperature in a liquid phase, which has been discharged from the gas-liquid separator 22, is introduced into the regenerator 27. The regenerator 27 makes heat exchange between the working fluid having a high temperature in a liquid phase as introduced from this gas-liquid separator 22 and the working fluid in a liquid phase flowing from the pump 26 toward the first evaporator 21a, to recover heat held by the working fluid on the high-temperature side to raise a temperature of the working fluid flowing toward the evaporator 21a. The working fluid in a liquid phase from the gas-liquid separator 22, which has been cooled through the heat exchange in this regenerator 27, is discharged from the regenerator 27 and then passes through the decompression unit 27a and is introduced into the first mixer 28.

In the first mixer 28, the working fluid in a gas phase as introduced from the turbine 23 comes into contact with the working fluid in a liquid phase, which has flowed from the regenerator 27 and passed through the decomposition unit 27a and then been introduced into it, to be mixed together, or sometimes a part of the working fluid in a gas phase is absorbed by the working fluid in a liquid phase, and is converted into a liquid phase, in the same manner as the first embodiment as described above of the present invention. The working fluid remaining in a gas phase flows together with the working fluid in a liquid phase toward the first condenser 24, and the working fluid is introduced in a gas-liquid two-phase into the first condenser 24.

In the first condenser 24, the working fluid in a gas-liquid two-phase as introduced from the first mixer 28 is caused to make heat exchange with the cold seawater as the low-temperature fluid, which has once passed through the second condenser 25 and then introduced into it, and when the whole of the working fluid is cooled, the working fluid in a gas phase is condensed into a liquid phase due to the cooling by the heat exchange. The working fluid, which has almost been converted into a liquid phase, is discharged from the first condenser 24 to the outside and then reaches the second mixer 29.

During such condensation, a substance having a high-boiling point of the working fluid in a gas phase first condenses and the temperature of the working fluid changes rapidly. Then, the temperature transitions into the similar state to an isothermal change and the temperature of the working fluid becomes to an approximate temperature at the outlet of the first condenser 24 for the low-temperature fluid.

The second mixer 29 received a part of the working fluid in a gas phase as introduced from the turbine 23, in the same manner as the first embodiment as described above of the present invention. The working fluid having a high temperature in a gas phase comes into contact with the working fluid in a liquid phase, which has been introduced from the first condenser 24 to be mixed together, or sometimes a part of the working fluid in a gas phase is absorbed by the working fluid in a liquid phase, and is converted into a liquid phase. The working fluid remaining in a gas phase flows together with the working fluid in a liquid phase toward the second condenser 25, and the working fluid is introduced in a gas-liquid two-phase into the condenser 25.

The concentration of ammonia of the working fluid as introduced into the second condenser 25 becomes higher than that of the working fluid in the first condenser 24 by joining a part of the working fluid in a gas phase having a high concentration of ammonia from the turbine 23 together with the working fluid in a liquid phase as introduced from the first condenser 24, in the same manner as the first embodiment as described above of the present invention.

In the second condenser 25, the working fluid in a gas-liquid two-phase as introduced from the second mixer 29 is caused to make heat exchange with the cold seawater having a low temperature as separately introduced as the low-temperature fluid and when the whole of the working fluid is cooled, the working fluid in a gas phase is condensed into a liquid phase due to the cooling by the heat exchange.

During such condensation, a substance having a high-boiling point of the working fluid in a gas phase first condenses and the temperature of the working fluid changes rapidly. Then, the temperature transitions into the similar state to an isothermal change and the temperature of the working fluid becomes to an approximate temperature at the outlet of the condenser for the low-temperature fluid. However, the concentration of ammonia of the working fluid in the second condenser 25 becomes higher than that of the working fluid in the first condenser 24, and the condensation temperature of the working fluid in the second condenser 25 becomes lower than the condensation temperature of the working fluid in the first condenser 24. Thus, it is possible to decrease sufficiently the temperature of the working fluid to make it close to the temperature of the low-temperature fluid by causing it to pass through the two condensers 24, 25.

The working fluid, which has almost been converted into a liquid phase in this manner, comes out from the second condenser 25 and then passes through the pump 26 to be pressurized and flows toward the regenerator 27. Then, the working fluid is introduced into the regenerator 27 and caused to make heat exchange with the working fluid in a liquid phase after separation by the gas-liquid separator 22 as described above to elevate the temperature, and comes out from the regenerator 27 and returns to the inside of the first evaporator 21a, and then the heat exchange step in the first evaporator 21a and the subsequent steps are repeated in the same manner as described above.

In the steam power cycle system according to the embodiment of the present invention, there is provided a plurality of condensers 21a, 21b that make heat exchange between the working fluid and the low-temperature fluid as the low-temperature heat source so as to be connected to each other in series and the working fluid in a liquid phase, which has been separated from the working fluid in a gas phase by the gas-liquid separator 22, is jointed together with the working fluids passing between the respective evaporators 21a, 21b, respectively. This enables the component ratio of the mixture of the working fluid in the respective evaporators 21a, 21b to vary, along with the joining of the working fluid from the first evaporator 21a and the working fluid in a liquid phase having a high ratio of water having a high-boiling point of the mixture to introduce them into the second evaporator 21b, with the result that the ratio of the substance having a high-boiling point of the working fluid becomes higher at the second evaporator 21b on the posterior side, thus making it possible to make the evaporation temperature of the working fluid higher than that of the first evaporator 21a on the anterior side. It is therefore possible to make the temperature of the working fluid close to the respective different temperatures of the high-temperature fluids in the respective evaporators 21a, 21b, and to increase gradually the temperatures of the working fluids on the outlet side of the respective evaporators to make the temperature of the working fluid possibly close to the temperature of the high-temperature fluid, thus permitting a further improvement in a cycle heat efficiency.

Figure 4:
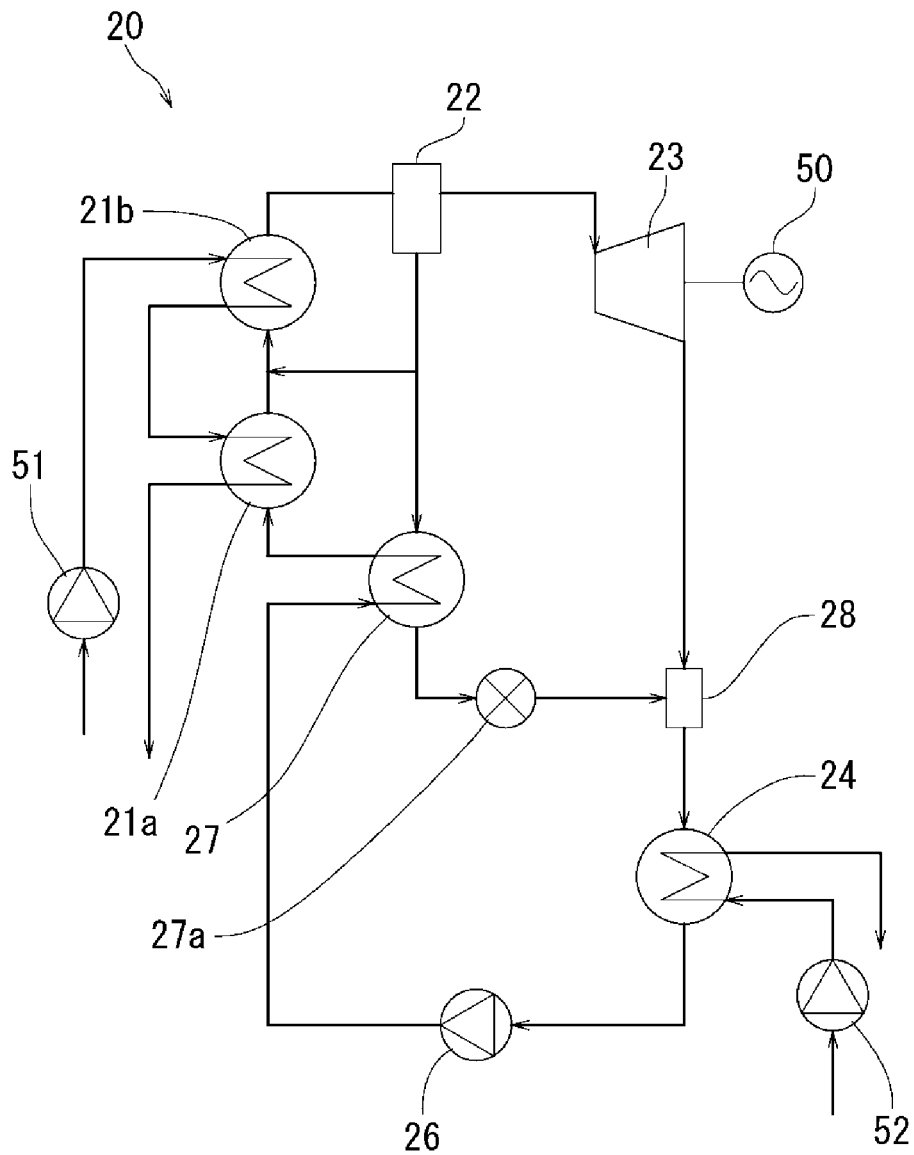
FIG. 4 is a schematic system diagram of the steam power cycle system according to the other embodiment of the present invention.

In the steam power cycle system according to the embodiment as described above of the present invention, a plurality of evaporators 21a, 21b and a plurality of condensers 24, 25 are provided. However, the present invention is not limited only to such an embodiment and the plurality of evaporators is provided on the one hand, and an only one condenser is provided in the same manner as a common steam power cycle, on the other hand, as shown in FIG. 4.

So long as there is adopted a structure in which a plurality of evaporators is provided and a part of the working fluid in a liquid phase, which has been separated from the gas phase substance by the gas-liquid separator, is joined together with the respective working fluids flowing between the respective evaporators, the remaining structure of the system may be based on a steam power cycle such as so-called Kalina cycle or Uehara cycle, which uses the non-azeotropic mixture as the working fluid, thus making it possible to increase the temperature of the working fluid in a plurality of evaporators to make it possibly close to the temperature of the high-temperature fluid, leading to an improvement in cycle heat efficiency in the same manner as the embodiment as described above of the present invention.

Example

Conditions such as amounts of heat input and output, pressures, etc for the steam power cycle system according to the present invention were used to determine heat efficiencies, and the resultants were compared with those for the conventional steam power cycle as comparative examples for assessment.

Concerning, as an example of the present invention, the same steam power cycle system as the first embodiment of the present invention as described above, i.e., the system in which the mixture of ammonia and water was used as the working fluid, and the working fluid from the turbine was introduced into each of the condensers provided in two stages, so that there was made heat exchange between the working fluids in gas and liquid phases and the low-temperature fluid in the respective condensers, values such as heat efficiencies were determined. For determination, various values of physical properties indicative of conditions of pressure, temperature, etc. of the working fluid at each of points (1 to 12) of the cycle as shown in FIG. 1 were determined with the use of assumed values based on the actual environment such as a heat-transfer performance of the heat exchanger such as the evaporator, condenser, etc.; temperature conditions of the high-temperature fluid and the low-temperature fluid serving as the heat source; and the like, and then the values of the theoretical heat efficiencies of the cycle were calculated.

Concerning the important conditions for the steam power cycle of this example of the present invention, there was used as the working fluid the mixture having a ratio by weight of ammonia to water of 95:5, i.e., having a mass fraction of ammonia/water of 0.95 kg/kg, and the inlet temperature $T_{WSi}$ of the evaporator on the high-temperature fluid side was set as 30° C. and the outlet temperature $T_{WSo}$ was set as 26° C. The inlet temperature $T_{CSi}$ of the series of condensers on the low-temperature fluid side was set as 8° C. and the outlet temperature $T_{CSo}$ was set as 11° C.

Concerning the other conditions for the steam power cycle, a flow rate of the high-temperature fluid was set as 400 t/h, a flow rate of the low-temperature fluid, 400 t/h, a flow rate of the working fluid, 140 t/h, a heat-transfer performance of the evaporator, 20000 kW/K, a heat-transfer performance (overall value) of the condenser, 20000 kW/K, and a heat-transfer performance of the regenerator, 150 kW/K.

The liquid phase substance of the working fluid as separated from the gas phase substance (a flow rate of 88.3 t/h, and being 63.1% of the total) by the gas-liquid separator 12 was 36.9% of the whole working fluid. The fluid of 71.2% of the working fluid in a gas phase from the turbine 13 flowed toward the first mixer 18 and the remaining working fluid in a gas phase (a flow rate of 25.4 t/h) flowed toward the second mixer 19.

There were calculated, based on such conditions, the respective values of pressure "P", temperature "T", ammonia mass fraction "Y", specific volume "V", specific enthalpy "h", specific entropy "s" and dryness "x" of the working fluid at each of the points (1 to 12) of the cycle. The calculation results are shown in Table 1.

TABLE 1

| POINT | T [° C.] | P [MPa] | Y [kg/kg] | V [m³/kg] | h [kJ/kg] | s [kJ/kgK] | x [—] |
|---|---|---|---|---|---|---|---|
| 1 | 15.14 | 0.642 | 0.909 | 0.0653 | 593.5 | 2.584 | 0.27 |
| 2 | 12.67 | 0.642 | 0.950 | 0.0016 | 222.6 | 1.212 | 0 |
| 3 | 12.74 | 0.929 | 0.950 | 0.0016 | 223.1 | 1.212 | — |
| 4 | 17.09 | 0.929 | 0.950 | 0.0016 | 243.5 | 1.283 | — |
| 5 | 26.94 | 0.929 | 0.950 | 0.0897 | 1028.1 | 3.916 | 0.54 |
| 6 | 26.94 | 0.929 | 1.000 | 0.1413 | 1495.6 | 5.393 | 1.00 |
| 7 | 26.94 | 0.929 | 0.865 | 0.0015 | 228.8 | 1.390 | 0 |
| 8 | 15.16 | 0.929 | 0.865 | 0.0015 | 173.4 | 1.202 | — |
| 9 | 15.20 | 0.642 | 0.865 | 0.0015 | 173.4 | 1.203 | 0 |
| 10 | 11.48 | 0.642 | 1.000 | 0.1933 | 1448.6 | 5.393 | 0.97 |
| 11 | 13.81 | 0.642 | 0.909 | 0.0015 | 198.3 | 1.210 | 0 |
| 12 | 13.75 | 0.642 | 0.950 | 0.0883 | 760.5 | 3.091 | 0.38 |

Figure 5:
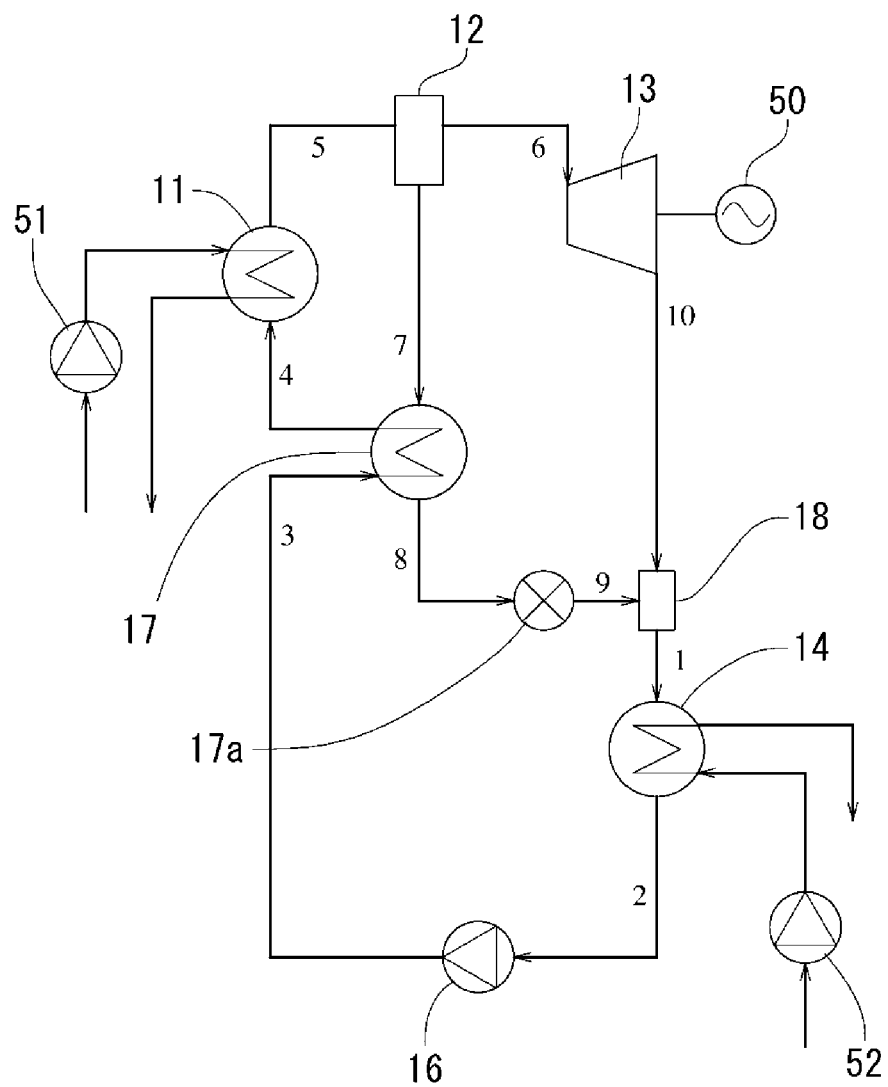
FIG. 5 is a schematic system diagram of a system of Kalina cycle serving as Comparison No. 1 relative to the steam power cycle system according to the embodiment of the present invention.

Concerning, as Sample for Comparison No. 1, the conventionally known steam power cycle system (see FIG. 5), which corresponded to the so-called Kalina cycle in which there were not used the second mixer and the second condenser of the structural components as described above of the present invention, and the total amount of the working fluid in a gas phase from the turbine was directed toward the first mixer 18, the conditions such as pressure, temperature, etc. of the working fluid at each of the points (1 to 10) of the cycle as shown in FIG. 5 were determined in the same manner as the example of the present invention as described above, and then the theoretical heat efficiencies of the cycle were obtained.

Figure 6:
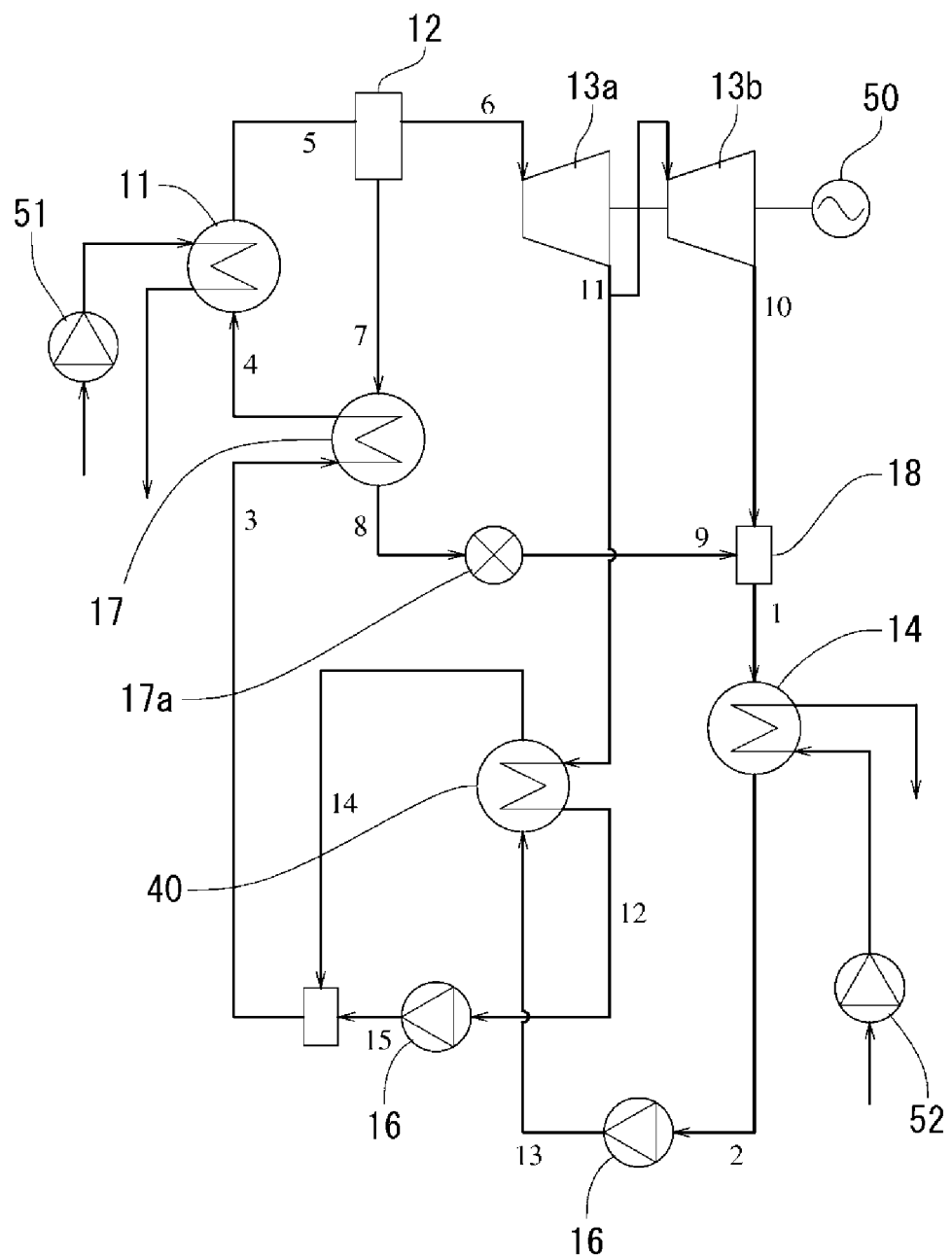
FIG. 6 is a schematic system diagram of a system of Uehara cycle serving as Comparison No. 2 relative to the steam power cycle system according to the embodiment of the present invention.
Figure 7:
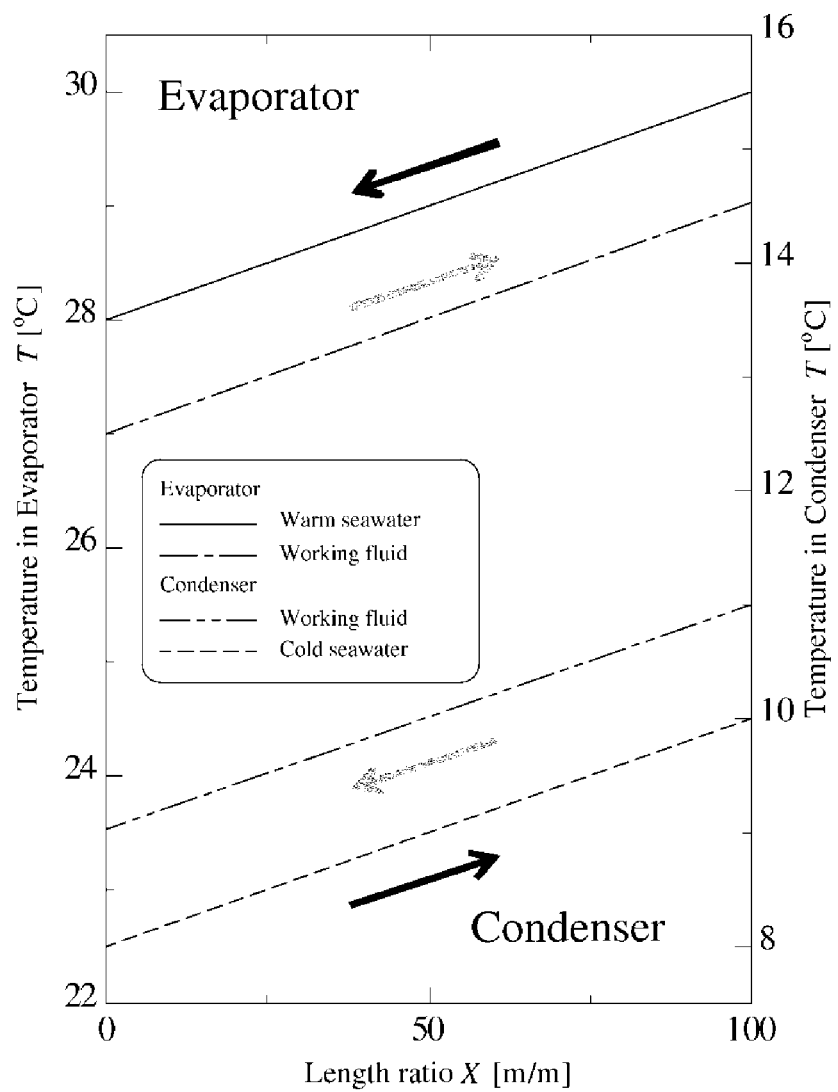
FIG. 7 is a descriptive view of a theoretical temperature change state in a heat exchanger in the conventional steam power cycle.
Figure 8:
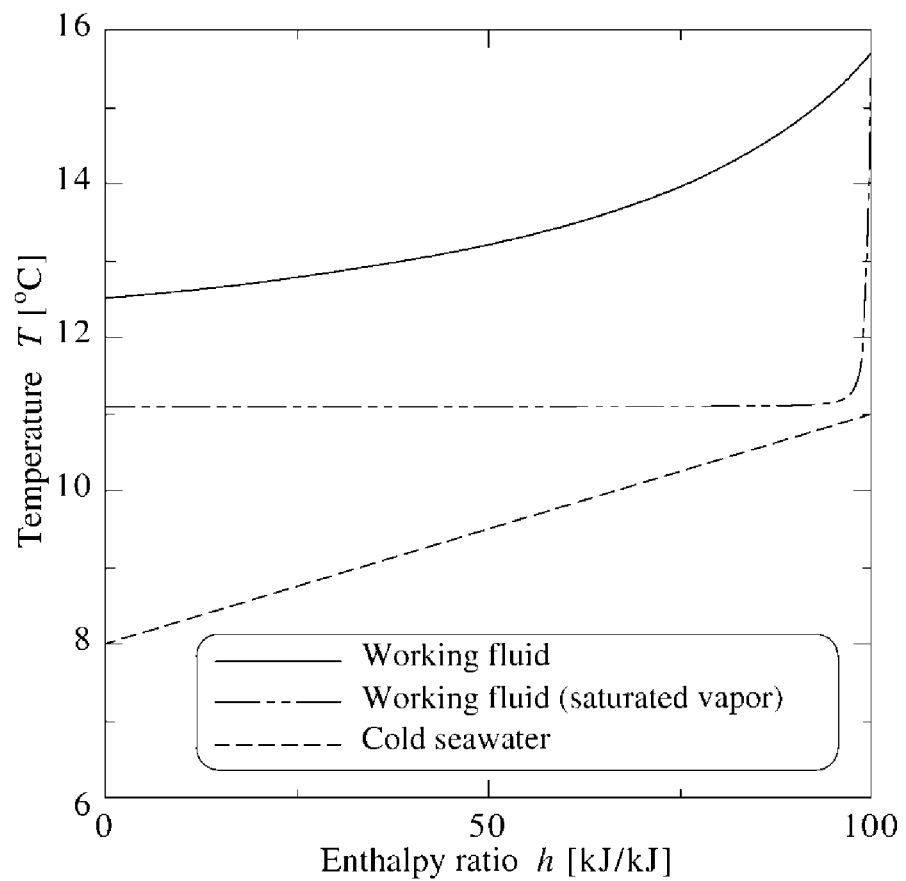
FIG. 8 is a conceptual diagram of temperature change in a condenser in the conventional steam power cycle.

Concerning, as Sample for Comparison No. 2, the conventional steam power cycle system (see FIG. 6), which corresponded to the so-called Uehara cycle in which the working fluid in a gas phase as extracted in the middle between turbines was caused to make heat exchange with the working fluid in a liquid phase, which has passed through the condenser, the conditions such as pressure, temperature, etc. of the working fluid at each of the points (1 to 15) of the cycle as shown in FIG. 6 were determined in the same manner as the example of the present invention as described above, and then the theoretical heat efficiencies of the cycle were obtained.

The conditions such as mass fraction of ammonia, temperature conditions of the high-temperature fluid and the low-temperature fluid, heat-transfer performance of the heat exchanger such as the evaporator, condenser, etc., were the same as those set in the system according to the present invention as described above, unless otherwise stated.

Concerning different conditions, a flow rate of the working fluid in a gas phase, which has been separated from the liquid phase substance by the gas-liquid separator and then flowed toward the turbine, was 87.3 t/h (62.4% of the working fluid) in Sample for Comparison No. 1, and was 90.3 t/h (64.5% of the working fluid) in Sample for Comparison No. 2.

In Sample for Comparison No. 2, a flow rate of the working fluid in a gas phase, which was to be extracted and then flowed toward the heater, of the working fluid in a gas phase as introduced into the turbine, was 0.364 t/h (0.403% of the amount of it as being introduced into the turbine, and being 0.26% of the total amount of the working fluid). In addition, the heat-transfer performance of the heater was set as 30 kW/K.

There were calculated, based on such conditions, the respective values of pressure "P", temperature "T", ammonia mass fraction "Y", specific volume "V", specific enthalpy "h", specific entropy "s" and dryness "x" of the working fluid at each of the points of the steam power cycle of the respective samples for comparison (see FIG. 5 and FIG. 6). The calculation results for Sample for Comparison No. 1 are shown in Table 2, and those for Sample for Comparison No. 2, Table 3.

TABLE 2

| POINT | T [° C.] | P [MPa] | Y [kg/kg] | V [m³/kg] | h [kJ/kg] | s [kJ/kgK] | x [—] |
|---|---|---|---|---|---|---|---|
| 1 | 15.84 | 0.662 | 0.950 | 0.1190 | 972.9 | 3.882 | 0.52 |
| 2 | 13.57 | 0.662 | 0.950 | 0.0016 | 226.8 | 1.227 | 0 |
| 3 | 13.63 | 0.932 | 0.950 | 0.0016 | 227.3 | 1.227 | — |
| 4 | 17.75 | 0.932 | 0.950 | 0.0016 | 246.7 | 1.294 | — |
| 5 | 26.94 | 0.932 | 0.950 | 0.0884 | 1019.5 | 3.886 | 0.54 |
| 6 | 26.94 | 0.932 | 1.000 | 0.1408 | 1495.4 | 5.391 | 1.00 |
| 7 | 26.94 | 0.932 | 0.867 | 0.0015 | 230.6 | 1.392 | 0 |
| 8 | 16.00 | 0.932 | 0.867 | 0.0015 | 179.1 | 1.217 | — |
| 9 | 16.03 | 0.662 | 0.867 | 0.0015 | 179.1 | 1.218 | 0 |
| 10 | 12.38 | 0.662 | 1.000 | 0.1882 | 1451.7 | 5.391 | 0.97 |

TABLE 3

| POINT | T [° C.] | P [MPa] | Y [kg/kg] | V [m³/kg] | h [kJ/kg] | s [kJ/kgK] | x [—] |
|---|---|---|---|---|---|---|---|
| 1 | 12.67 | 0.665 | 0.950 | 0.1226 | 999.4 | 3.912 | 0.54 |
| 2 | 13.74 | 0.665 | 0.950 | 0.0016 | 227.6 | 1.229 | 0 |
| 3 | 14.47 | 0.925 | 0.950 | 0.0016 | 231.2 | 1.240 | — |
| 4 | 18.21 | 0.925 | 0.950 | 0.0016 | 248.8 | 1.301 | — |
| 5 | 27.01 | 0.925 | 0.950 | 0.0922 | 1045.4 | 3.974 | 0.55 |
| 6 | 27.01 | 0.925 | 1.000 | 0.1420 | 1496.1 | 5.396 | 1.00 |
| 7 | 27.01 | 0.925 | 0.859 | 0.0015 | 225.3 | 1.387 | 0 |
| 8 | 16.45 | 0.925 | 0.859 | 0.0015 | 175.6 | 1.219 | — |
| 9 | 16.49 | 0.665 | 0.859 | 0.0015 | 175.6 | 1.220 | 0 |
| 10 | 12.59 | 0.665 | 1.000 | 0.1875 | 1454.0 | 5.396 | 0.97 |
| 11 | 18.64 | 0.795 | 1.000 | 0.1606 | 1476.5 | 5.396 | 0.99 |
| 12 | 17.68 | 0.795 | 1.000 | 0.0016 | 282.5 | 1.291 | 0 |
| 13 | 13.80 | 0.925 | 0.950 | 0.0016 | 228.0 | 1.229 | — |
| 14 | 14.46 | 0.925 | 0.950 | 0.0016 | 231.1 | 1.240 | — |
| 15 | 17.71 | 0.925 | 1.000 | 0.0016 | 282.7 | 1.291 | 0 |

Based on the condition of the working fluid at the respective point of the cycle system, as indicated in Table 1 above, the heat efficiency $\eta_{th}$ of the cycle of the example of the present invention may be expressed as follows:

$$\eta_{th} = (W_T - W_{PWF})/Q_E$$

wherein, turbine output $W_T = m_{WFT}(h_6 - h_{10}) = 88.3 \times 10^3 (1495.6 \times 10^3 - 1448.6 \times 10^3)/3600 = 4150.1 \times 10^6/3600$ pump power $W_{PWF} = m_{WF}(h_3 - h_2) = 140 \times 10^3 (223.1 \times 10^3 - 222.6 \times 10^3)/3600 = 70 \times 10^6/3600$ amount of heat exchange of evaporator $Q_E = m_{WF}(h_5 - h_4) = 140 \times 10^3 (1028.1 \times 10^3 - 243.5 \times 10^3)/3600 = 109844 \times 10^6/3600$ As a result, $\eta_{th} = (W_T - W_{PWF})/Q_E = (4150.1 - 70)/109844 = 0.0371$ Therefore, the heat efficiency of the cycle of the example of the present invention was 3.71%.

Then, based on the condition of the working fluid at the respective point of the cycle system, as indicated in Table 2 above, the heat efficiency $\eta_{th}$ of the cycle of Sample for Comparison No. 1 may be expressed as follows:

$$\eta_{th} = (W_T - W_{PWF})/Q_E$$

wherein, turbine output $W_T = m_{WFT}(h_6 - h_{10}) = 87.3 \times 10^3 (1495.4 \times 10^3 - 1451.7 \times 10^3)/3600 = 3815 \times 10^6/3600$ pump power $W_{PWF} = m_{WF}(h_3 - h_2) = 140 \times 10^3 (227.3 \times 10^3 - 226.8 \times 10^3)/3600 = 70 \times 10^6/3600$ amount of heat exchange of evaporator $Q_E = m_{WF}(h_5 - h_4) = 140 \times 10^3 (1019.5 \times 10^3 - 246.7 \times 10^3)/3600 = 108192 \times 10^6/3600$ As a result, $\eta_{th} = (W_T - W_{PWF})/Q_E = (3815 - 70)/108192 = 0.0346$ Therefore, the heat efficiency of the cycle of Sample for Comparison No. 1 was 3.46%.

Then, based on the condition of the working fluid at the respective point of the cycle system, as indicated in Table 3 above, the heat efficiency $\eta_{th}$ of the cycle of Sample for Comparison No. 2 may be expressed as follows:

$$\eta_{th} = (W_T - W_{PWF})/Q_E$$

wherein, turbine output $W_T = W_{T1} + W_{T2} = m_{WFT}\xi(h_6 - h_{11}) + m_{WFT}(\xi - x)(h_{11} - h_{10}) = 90.3 \times 10^3 (1496.1 \times 10^3 - 1476.5 \times 10^3)/3600 + (90.3 - 0.364) \times 10^3 (1476.5 \times 10^3 - 1454 \times 10^3)/3600 = (1769.9 + 2023.6) \times 10^6/3600 = 3793.5 \times 10^6/3600$ pump power $W_{PWF} = W_{PWF1} + W_{PWF2} = m_{WF}(1 - x)(h_{13} - h_2) + m_{WF} \times (h_{15} - h_{12}) = (140 - 0.364) \times 10^3 (228.0 \times 10^3 - 227.6 \times 10^3)/3600 + 0.364 \times 10^3 (282.7 \times 10^3 - 282.5 \times 10^3)/3600 = 55.9 \times 10^6/3600$ amount of heat exchange of evaporator $Q_E = m_{WF}(h_5 - h_4) = 140 \times 10^3 (1045.4 \times 10^3 - 248.8 \times 10^3)/3600 = 111524 \times 10^6/3600$ As a result, $\eta_{th} = (W_T - W_{PWF})/Q_E = (3793.5 - 55.9)/111524 = 0.0335$ Therefore, the heat efficiency of the cycle of Sample for Comparison No. 2 was 3.35%.

It was revealed from the calculated results of the heat efficiency for the example of the present invention as described above and each of the samples for comparison that the heat efficiency of the steam power cycle system of the example of the present invention was improved remarkably in comparison with the conventional steam power cycles in which the mixture of ammonia and water was used as the working fluid.

It was recognized from the foregoing that the steam power cycle system of the example of the present invention permitted to improve the heat efficiency of the cycle by condensing the working fluid in a gas phase from the turbine by a plurality of condensers to decrease the temperature and pressure of the working fluid at the outlet of the condenser at the final stage, thus effectively utilizing the difference in temperature between the high-temperature fluid as the heat source and the low-temperature fluid.

REFERENCE SIGNS LIST 10, 20 steam power cycle system
11, 21a, 21b evaporator
12, 22 gas-liquid separator
13, 23 turbine
13a, 13b turbine
14, 15, 24, 25 condenser
16, 26 pump
17, 27 regenerator
18, 19, 28, 29 mixer
40 heater
50 power generator
51, 52 pump

What is claimed is:
1. A steam power cycle system, which comprises:
an evaporator that causes a working fluid of non-azeotropic mixture to make heat exchange with a predetermined high-temperature fluid and evaporates at least part of said working fluid;
a gas-liquid separator that separates the working fluid having a high temperature and obtained by said evaporator into a gas phase substance and a liquid phase substance;
an expander that receives the gas phase substance of said working fluid as introduced to convert heat energy held by a fluid into a power;
a condenser that causes the working fluid in a gas phase from said expander and the working fluid in a liquid phase from said gas-liquid separator together to make heat exchange with a predetermined low-temperature fluid and condenses the gas phase substance; and a pump that pumps the working fluid from said condenser toward said evaporator, wherein:

the condenser is configured as a plurality of condensers, each condenser of said plurality of condensers having a flow channel on a working fluid side, which is connected in series and each condenser of said plurality of condensers having a flow channel on a low-temperature fluid side, which is connected in series, so as to provide a flow channel design in which the low-temperature fluid passes through the respective plurality of condensers in reverse order to an order in which the working fluid passes through the plurality of condensers;

the plurality of condensers comprising a first stage condenser and a second stage condenser, the first stage condenser being adjacent to the second stage condenser;

a part of the working fluid in the gas phase from said expander is drawn from an outlet of the expander and is directly joined together with the working fluid which is discharged from the first stage condenser at the flow channel between the first and the second stage condensers of the plurality of condensers; and the working fluid in the gas phase is condensed by the first stage condenser of the plurality of condensers which is disposed in proximity to the outlet of said expander in the flow channel for the working fluid, and the working fluid in the gas phase is joined together with the working fluid at the location between the first and the second condensers of the plurality of condensers and the working fluid is also condensed by the second stage condenser, the second stage condenser being distinct from the first stage condenser.

2. The steam power cycle system as claimed in claim 1, wherein:

the evaporator is configured as a plurality of evaporators, each evaporator of said plurality of evaporators having a flow channel on a working fluid side, which is connected in series, and each evaporator of said plurality of evaporators having a flow channel on a high-temperature fluid side, which is connected in series, so as to provide a flow channel design in which the high temperature fluid passes through each evaporator of said plurality of evaporators in reverse order to an order in which the working fluid passes through each evaporator of said plurality of evaporators;

the plurality of evaporators comprising a first stage evaporator and a second stage evaporator, the first stage evaporator is adjacent to the second stage evaporator;

a part of the working fluid in the liquid phase, which has been separated from the working fluid in the gas phase by said gas-liquid separator, is drawn from an outlet of the gas-liquid separator and is directly joined together with the working fluid which is discharged from the first stage evaporator at the flow channel between the first and the second stage evaporators of the plurality of evaporators; and a temperature of the working fluid in a mixed state is raised by the second stage evaporator of the plurality of evaporators, the second stage evaporator being distinct from the first stage evaporator of the plurality of evaporators which is disposed in a closest position to an outlet of said pump on the channel for the working fluid.

3. A steam power cycle system, which comprises:

an evaporator that causes a working fluid of non-azeotropic mixture to make heat exchange with a predetermined high-temperature fluid and evaporates at least part of said working fluid;

a gas-liquid separator that separates the working fluid having a high temperature and obtained by said evaporator into a gas phase substance and a liquid phase substance;

an expander that receives the gas phase substance of said working fluid as introduced to convert heat energy held by a fluid into a power;

a condenser that causes the working fluid in a gas phase from said expander and the working fluid in a liquid phase from said gas-liquid separator together to make heat exchange with a predetermined low-temperature fluid and condenses the gas phase substance; and a pump that pumps the working fluid from said condenser toward said evaporator, wherein:

the evaporator is configured as a plurality of evaporators, each evaporator of said plurality of evaporators having a flow channel on a working fluid side, which is connected in series and each evaporator of said plurality of evaporators having a flow channel on a high-temperature fluid side, which is connected in series, so as to provide a flow channel design in which the high temperature fluid passes through each evaporator of said plurality of evaporators in reverse order to an order in which the working fluid passes through each evaporator of said plurality of evaporators;

the plurality of evaporators comprising a first stage evaporator and a second stage evaporator, the first stage evaporator is adjacent to the second stage evaporator;

a part of the working fluid in the liquid phase, which has been separated from the working fluid in the gas phase by said gas-liquid separator, is drawn from an outlet of the gas-liquid separator and is directly joined together with the working fluid which is discharged from the first stage evaporator at the flow channel between the first and the second stage evaporators of the plurality of evaporators; and a temperature of the working fluid in a mixed state is raised by the second stage evaporator of the plurality of evaporators, the second stage evaporator being distinct from the first stage evaporator of the plurality of evaporators which is disposed in a closest position to an outlet of said pump on the channel for the working fluid.

* * * * *